United States Patent
Lee et al.

(10) Patent No.: US 7,613,398 B2
(45) Date of Patent: Nov. 3, 2009

(54) WAVELENGTH-TUNABLE LIGHT SOURCE AND WAVELENGTH-DIVISION MULTIPLEXED TRANSMISSION SYSTEM USING THE SOURCE

(75) Inventors: Chang-Hee Lee, Daejon (KR); Hyun Deok Kim, Daegu (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 6 days.

(21) Appl. No.: 12/004,693

(22) Filed: Dec. 21, 2007

(65) Prior Publication Data
US 2008/0232805 A1    Sep. 25, 2008

Related U.S. Application Data

(62) Division of application No. 10/394,076, filed on Mar. 21, 2003, now Pat. No. 7,327,957.

(30) Foreign Application Priority Data
May 3, 2002    (KR) .................. 10-2002-0024493

(51) Int. Cl.
H04J 14/02    (2006.01)
(52) U.S. Cl. ......................... 398/82; 398/91
(58) Field of Classification Search .............. 398/34, 398/82, 91, 92, 157
See application file for complete search history.

(56) References Cited

U.S. PATENT DOCUMENTS

| 4,563,087 A | 1/1986 | Bourbin et al. |
|---|---|---|
| 5,202,780 A | 4/1993 | Fussanger |
| 5,221,983 A | 6/1993 | Wagner |
| 5,251,001 A | 10/1993 | Dave et al. |
| 5,276,543 A | 1/1994 | Olshansky |
| 5,321,541 A | 6/1994 | Cohen |
| 5,436,760 A | 7/1995 | Nakabayashi |
| 5,440,417 A | 8/1995 | Chung et al. |

(Continued)

FOREIGN PATENT DOCUMENTS

EP    1 124 296 A2    8/2001

(Continued)

OTHER PUBLICATIONS

Hyun Deok Kim, et al., "A Low-Cost WDM Source with an ASE Injected Fabry-Perot Semiconductor Laser," XP000968561, IEEE Photonics Technology Letters, vol. 12, No. 8, pp. 1067-1069 (Aug. 2000).

(Continued)

*Primary Examiner*—Dalzid Singh
(74) *Attorney, Agent, or Firm*—Blakely, Sokoloff, Taylor & Zafman LLP (57) ABSTRACT

The present invention relates to a wavelength-tunable light source whose output wavelength can be externally controlled and a wavelength-division multiplexed transmission system using the source.

A wavelength-tunable light source in accordance with the present invention is constituted to be able to vary the output wavelength of a Fabry-Perot laser diode, that is wavelength-locked to an injected light, by controlling the wavelength of the injected light.

A wavelength-tunable light source in accordance with the present invention provides comparatively large output power and excellent economic features.

The present invention also presents a wavelength-division multiplexed transmission system using, the wavelength-tunable light source.

1 Claim, 11 Drawing Sheets

U.S. PATENT DOCUMENTS

| | | |
|---|---|---|
| 5,550,666 A | 8/1996 | Zirngibl |
| 5,625,478 A | 4/1997 | Doerr et al. |
| 5,646,774 A | 7/1997 | Takara et al. |
| 5,661,585 A | 8/1997 | Feldman et al. |
| 5,694,234 A | 12/1997 | Darcie et al. |
| 5,793,512 A | 8/1998 | Ryu |
| 5,835,517 A | 11/1998 | Jayaraman et al. |
| 5,880,865 A | 3/1999 | Lu et al. |
| 5,894,247 A | 4/1999 | Yoshida et al. |
| 5,907,417 A | 5/1999 | Darcie et al. |
| RE36,471 E | 12/1999 | Cohen |
| 6,034,799 A | 3/2000 | Hansen |
| 6,097,523 A | 8/2000 | Boot |
| 6,134,250 A | 10/2000 | Koren et al. |
| 6,137,611 A | 10/2000 | Boivin et al. |
| 6,192,170 B1 | 2/2001 | Komatsu |
| 6,304,350 B1 | 10/2001 | Doerr et al. |
| 6,498,871 B1 | 12/2002 | Kuboki |
| 6,597,482 B1 | 7/2003 | Chung et al. |
| 6,650,840 B2 | 11/2003 | Feldman |
| 6,674,969 B1 | 1/2004 | Ogusu |
| 6,888,856 B2 | 5/2005 | Green et al. |
| 6,941,074 B2 | 9/2005 | Nakamura et al. |
| 7,006,719 B2 | 2/2006 | Joyner et al. |
| 7,106,974 B2 | 9/2006 | Lee et al. |
| 7,171,123 B2 | 1/2007 | Lee et al. |
| 7,327,957 B2 | 2/2008 | Lee et al. |
| 7,349,631 B2 | 3/2008 | Lee et al. |
| 7,403,718 B2 * | 7/2008 | Matthews et al. ........... 398/196 |
| 2001/0004290 A1 | 6/2001 | Lee et al. |
| 2001/0013962 A1 | 8/2001 | Li et al. |
| 2002/0067526 A1 | 6/2002 | Park et al. |
| 2002/0097768 A1 | 7/2002 | Thornton |
| 2002/0126345 A1 | 9/2002 | Green et al. |
| 2003/0095736 A1 | 5/2003 | Kish, Jr. et al. |
| 2003/0142978 A1 | 7/2003 | Lee et al. |
| 2003/0165006 A1 * | 9/2003 | Stephens et al. ............ 359/337 |
| 2003/0206740 A1 | 11/2003 | Lee et al. |
| 2003/0223672 A1 | 12/2003 | Joyner et al. |
| 2004/0033004 A1 | 2/2004 | Welch et al. |
| 2004/0175188 A1 | 9/2004 | Bellemare et al. |
| 2006/0263090 A1 | 11/2006 | Lee et al. |

FOREIGN PATENT DOCUMENTS

| | | |
|---|---|---|
| EP | 1 195 867 A1 | 4/2002 |
| KR | 00-33946 | 6/2000 |
| KR | 00-39036 | 7/2000 |
| KR | 10-2001-0063062 A | 7/2001 |
| KR | 01-93921 | 10/2001 |
| KR | 0325687 | 2/2002 |
| KR | 10-2003-0063085 A | 7/2003 |
| KR | 10-2003-0065632 A | 8/2003 |
| KR | 10-2003-0086223 | 11/2003 |
| KR | 0454887 | 10/2004 |
| KR | 0496710 | 6/2005 |
| KR | 10-0515259 | 9/2005 |
| WO | WO 98/32196 A1 | 7/1998 |
| WO | WO 99/37002 A1 | 7/1999 |
| WO | WO 99/59010 A1 | 11/1999 |
| WO | WO 03/032547 A2 | 4/2003 |
| WO | WO 03/065621 A1 | 8/2003 |
| WO | WO 03/107057 A1 | 12/2003 |

OTHER PUBLICATIONS

Robert D. Feldman, et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).

H. Takahashi, et al., "Transmission characteristics of arrayed-waveguide N x N wavelength multiplexer," IEEE Photonic Technology Letters, vol. 13, No. 3, pp. 447-455 (Mar. 1995).

International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).

J. Heanue et al., "Widely Tunable Laser Module using DFB Array and MEMS Selection with Internal Wavelength Locker", OFC 2003/ vol. 1, pp. 82-83.

B. Pezeshki et al., "12 Element Multi-wavelength DFB Arrays for Widely Tunable Laser Modules", OFC 2002, pp. 711-712.

Jae-Sung Lee, "Signal-to-Noise Ratio Measurement of a 2.5-Gb/s Spectrum-Sliced Incoherent Light Channel," IEEE Photonics Technology Letters, vol. 9, No. 1, pp. 94-96 (Jan. 1997).

Chang-Hasnain of al., "Integrated external cavity quantum well laser array using single epitaxial growth on a patterned substrate," Applied Physics Letters, vol. 56, No. 5 (Jan. 1990).

Zirngibl, M., et al., "An 18-Channel Multifrequency Laser", IEEE Photonics Technology Letters, vol. 8. No. 7, pp. 870-872 (Jul. 1996).

* cited by examiner

WAVELENGTH-TUNABLE LIGHT SOURCE AND WAVELENGTH-DIVISION MULTIPLEXED TRANSMISSION SYSTEM USING THE SOURCE

CROSS-REFERENCE TO RELATED APPLICATION

The present application claims priority from and is a divisional of U.S. patent application Ser. No. 10/394,076, filed Mar. 21, 2003 now U.S. Pat. No. 7,327,957, which claims priority under 35 U.S.C. 119 from Republic of Korea patent application number 2002-24493, filed May 3, 2002.

BACKGROUND OF THE INVENTION

1. Field of the Invention

The present invention relates to a light source providing a wavelength-selective output. In more detail, it relates to a wavelength-tunable light source whose output wavelength can be externally controlled and a wavelength-division multiplexed (WDM) transmission system using the source.

2. Description of the Related Art

The light source providing output at a specific wavelength is one of the key-elements of a wavelength-division multiplexed transmission system, in which each channel is discriminated by its wavelength.

In order to minimize the interference between adjacent channels, the light source of wavelength-division multiplexed transmission system should have a stable wavelength and a sufficient side mode suppression ratio (SMSR). It is also desirable to have a high output power and a narrow line width.

A distributed feed-back laser diode (DFBLD) is a representative light source in the prior art that meets the requirements described above.

However, the DFBLD is very expensive and requires a complicated control process to fix its output wavelength at a specified point. A spectrum-sliced system, which uses a broad-band light source instead of wavelength-specified light source, has been demonstrated to reduce the cost and the complexity of system.

Incoherent broad-band light sources (ILSs) such as a light emitting diode (LED), a super-luminescent diode (SLD), and optical amplifiers emitting amplified spontaneous emissions (ASEs) are representative light sources being used for spectrum-sliced system. Spectrum-sliced systems using these light sources are very attractive since they are able to simply the wavelength control process compared with the distributed feed-back laser diode.

U.S. Pat. No. 5,440,417 (System for spectrum-sliced fiber amplifier light for multi-channel wavelength-division-multiplexed applications) discloses a method of spectrum-slicing by using optical amplifier light source. And U.S. Pat. No. 5,694,234 (Wavelength division multiplexing passive optical network including broadcast overlay) discloses a spectrum-sliced system by using a directly-modulated LED.

However, they also have several disadvantages. For example, LED or an SLD hardly provides sufficient output power and an optical amplifier light source requires an expensive external modulator even though its output power is comparatively large.

That is to say, the system presented in U.S. Pat. No. 5,440,417 requires an additional external modulator and the system presented in U.S. Pat. No. 5,694,234 hardly provides sufficient output power.

On the other hand, a wavelength-tunable light source improves the functionality of a wavelength-division multiplexed transmission system.

One can tune the output wavelength of a distributed feed-back laser diode (DFBLD) by temperature control, however, the tunable wavelength range is only about a few nanometers in 1270~1600 nm band, the low-loss wavelength regime of a general silica-based single mode fiber.

Therefore, wavelength-tunable light sources employing an external cavity have been mainly studied in the prior art, however, they are costly and require complex devices to tune the output wavelength.

SUMMARY OF THE INVENTION

The present invention is proposed to solve the problems of the prior art mentioned above. The present invention presents a wavelength-tunable light source using a Fabry-Perot laser diode and a wavelength-division multiplexed transmission system employing the light source.

A Fabry-Perot laser diode can provide higher output power than both LED and SLD and is relative simple to manufacture compared with a distributed feed-back laser diode (DFBLD). However, it had not been used for a wavelength-division multiplexed transmission system since it is a multi-mode light source.

However, KR Patent 1003256870000 (A light source for wavelength-division multiplexed telecommunication system using a Fabry-Perot laser diode wavelength-locked by an injected incoherent light, registered at Feb. 8, 2002) presents a method to obtain a wavelength-selective output by using a Fabry-Perot laser diode. By externally injecting a narrow-band light into a Fabry-Perot laser diode, the side mode suppression ratio increased and a high output power at a specific wavelength is obtainable.

As described above, a wavelength-tunable light source in accordance with the present invention is constituted to be able to tune the output wavelength by controlling the wavelength of the externally injected light.

With this characteristic, the characteristics of the wavelength-tunable light source such as side mode suppression ratio, noise property, output power and output spectrum also can be controlled by controlling the bias current supplied to the Fabry-Perot laser diode.

DESCRIPTION OF THE NUMERALS
(SYMBOLS) ON THE MAIN PARTS OF THE
DRAWINGS

100: an optical transmission system
BLS: a broad-band light source
EDFA: a two-stage Erbium-doped fiber amplifier
(D)MUX1: a 2N×1 (de)multiplexer
(D)MUX2: an N×1 (de)multiplexer
DR: a laser diode driving circuit
EM: an external modulator
EMDR: an external modulator driving circuit
FPLD: a Fabry-Perot laser diode
IL: an wavelength interleaver
OC: an optical circulator
OSA: an optical spectrum analyzer
OSC: an oscilloscope
RX: an optical receiver
TBPF: a tunable band-pass filter
TEC: a temperature controller
WDM: a wavelength-division multiplexer

DETAILED DESCRIPTION OF THE
EMBODIMENTS

Hereinafter, referring to appended drawings, the structures and operation principles of embodiments of the present invention are described in detail.

Figure 1:
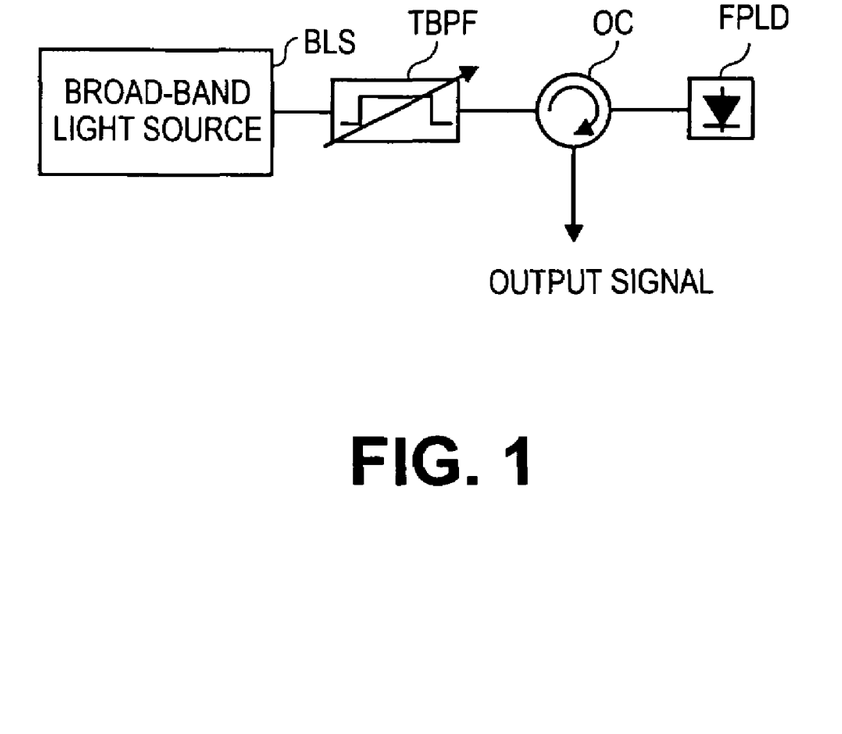
FIG. 1 is a schematic diagram of an embodiment of a wavelength-tunable light source in accordance with the present invention.

As described in FIG. 1, a wavelength-tunable light source in accordance with the present invention comprises a broad-band light source (BLS), a tunable band-pass filter (TBPF), an optical circulator and a Fabry-Perot laser diode.

Here, a broad-band light source is either one of a incoherent light sources such as a fiber optical amplifier emitting amplified spontaneous emissions, a semiconductor optical amplifier, a light emitting diode and a super-luminescent or a coherent light source super continuum source.

It is desirable that a Fabry-Perot laser diode (FPLD) should not contain an optical isolator for a efficient light injection.

A tunable band-pass filter (TBPF) selectively passes the light to be injected.

A Fabry-Perot laser diode (FPLD) is a multi-mode light source without an external light being injected thereto, however, if a light is injected thereto from outside, among the oscillation modes of the Fabry-Perot laser diode, a mode or modes within the range of the injected light will output relatively high power while the modes out of the range will be suppressed.

Consequently, a wavelength-selective output is outputted through an optical circulator (OC) connected to a Fabry-Perot laser diode (FPLD).

Here, since the output wavelength of the light source is determined by the light injected into a Fabry-Perot laser diode (FPLD), it can be tuned by controlling the band-pass of a tunable band-pass filter (TBPF).

The wavelengths of cavity modes of a Fabry-Perot laser diode (FPLD) vary according to the temperature of the Fabry-Perot laser diode.

With this characteristic, the characteristics of a wavelength-tunable light source such as side mode suppression ratio, noise property, output power, and output spectrum can be controlled by controlling the bias current supplied to the Fabry-Perot laser diode (FPLD).

In addition, the characteristics of a wavelength-tunable light source such as side mode suppression ratio, noise property, output power, and output spectrum also can be controlled by controlling the current of a Fabry-Perot laser diode (FPLD).

The output power of the wavelength-tunable light source varies as the bias current applied to a Fabry-Perot laser diode (FPLD).

Thus, a wavelength-tunable light source can be modulated not only by using an external modulator but also directly.

If an appropriate current is being applied to a Fabry-Perot laser diode (FPLD), the output of a wavelength-tunable light source is polarized, however, the reflected injection light can be unpolarized.

With this characteristic, the extinction ratio of a modulated optical signal can be improved by additionally installing a polarization controller and a polarizer at the output port of an optical circulator (OC).

That is to say, by controlling a polarization controller for the output power of a wavelength-tunable light source to be maximized, the extinction ratio of the output of a wavelength-tunable light source can be maximized.

In a light source in accordance with the present invention, an optical circulator (OC) is used to reduce optical insertion losses.

However, even though an optical circulator (OC) is substituted with a low-cost optical power combiner, a light source having the similar characteristics can be achieved.

Figure 2:
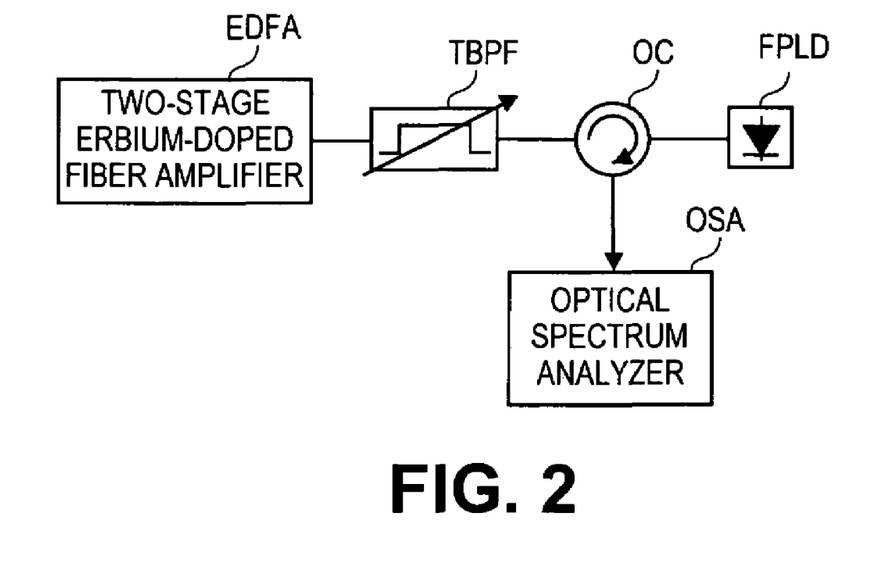
FIG. 2 is a schematic diagram of an experimental setup for measuring the characteristics of an embodiment of a wavelength-tunable light source in accordance with the present invention.

FIG. 2 shows an experimental setup for measuring the characteristics of an embodiment of a wavelength-tunable light source in accordance with the present invention.

A two-stage Erbium-doped fiber amplifier (EDFA) is used for an broad-band light source (BLS) in FIG. 1, and a Fabry-Perot etalon filter is used for a tunable band-pass filter (TBPF).

The two-stage Erbium-doped fiber amplifier (EDFA) outputs amplified spontaneous emission (ASE), which is a incoherent light having a band-width larger than 30 nm.

A Fabry-Perot etalon filter (FPEF) with a 3-dB band-width of about 2.5 GHz selectively passes erbium-doped fiber amplifier (EDFA) output and the pass-band can be controlled by applying the voltage.

The power of the incoherent light injected into a Fabry-Perot laser diode (FPLD) through an optical circulator (OC) is −2 dBm, the threshold current of the Fabry-Perot laser diode (FPLD) is 10 mA, and a bias current of 17 mA is applied thereto.

The cavity length of the Fabry-Perot laser diode (FPLD) is about 400 um and the mode spacing is about 100 GHz, which corresponds to 40 times of the 3-dB band-width of the Fabry-Perot etalon filter (FPEF).

In the figure, OSA represents an optical spectrum analyzer.

Figure 3A:
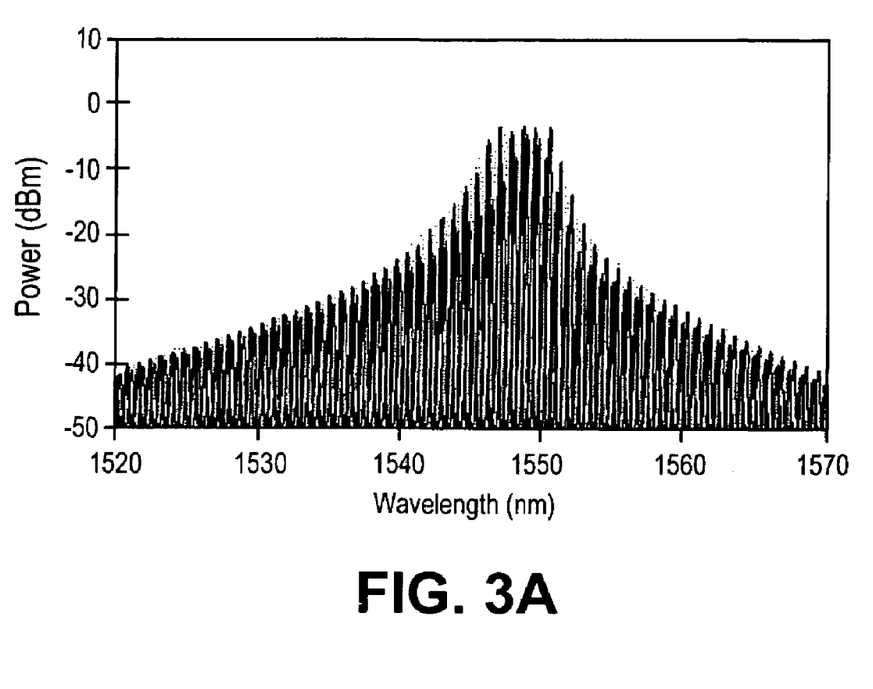
FIG. 3a.~FIG. 3c are optical spectra measured by the experimental setup described in FIG. 2.
Figure 3B:
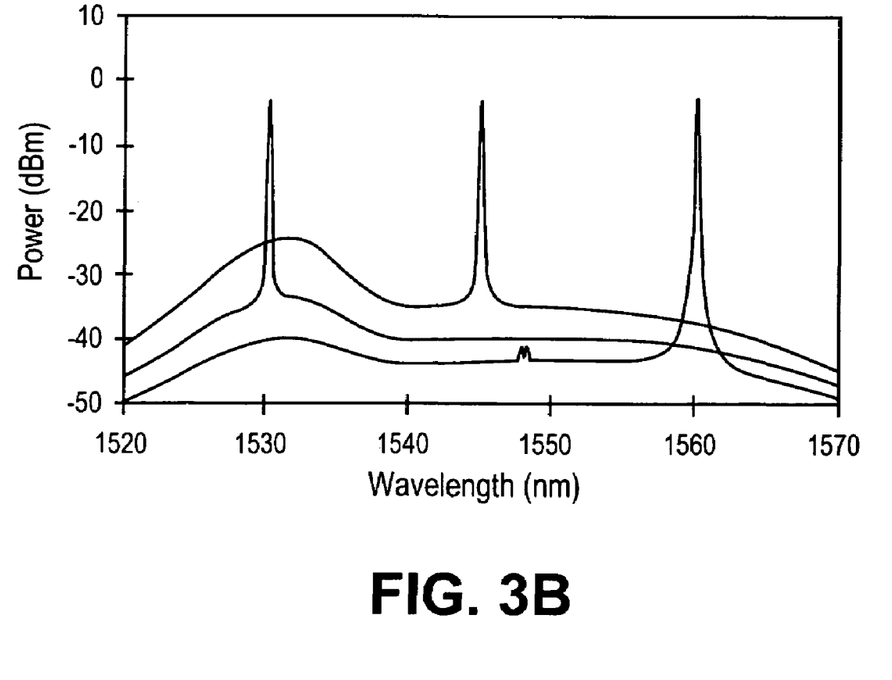
Figure 3C:
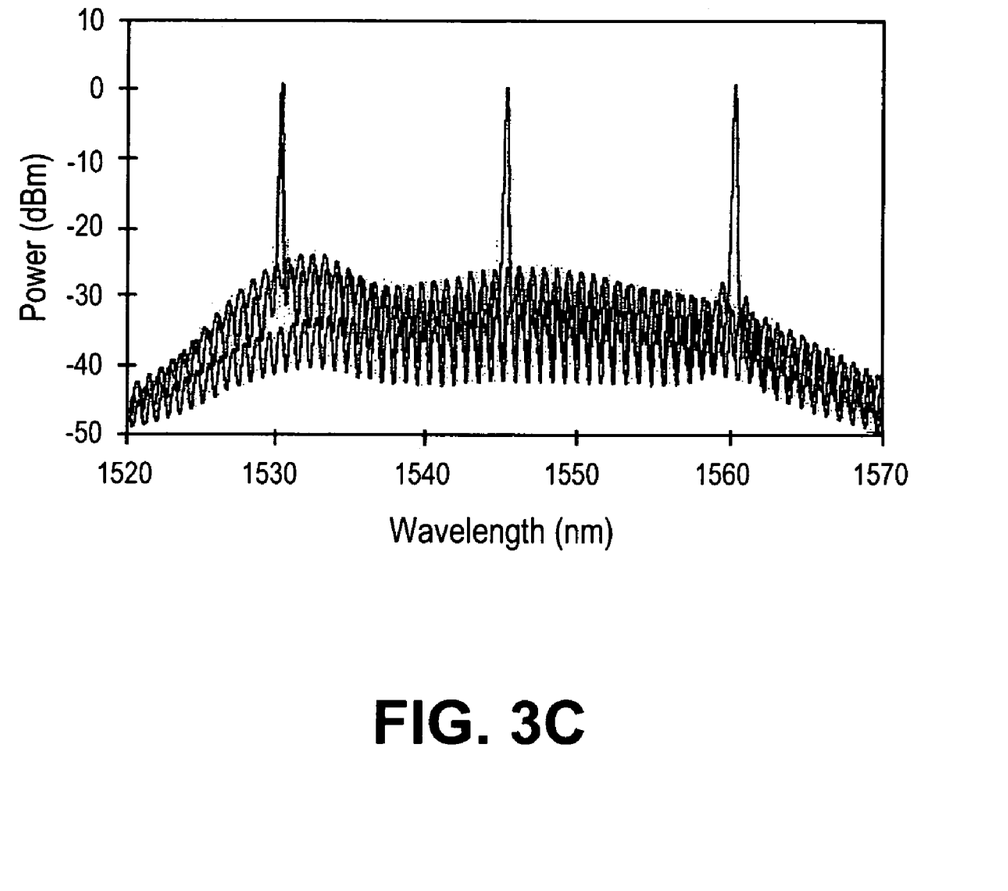

FIG. 3a shows output spectra of a Fabry-Perot laser diode (FPLD) measured without an ASE injection, FIG. 3b shows the spectra of lights injected into a Fabry-Perot laser diode, and FIG. 3c shows the output spectra of a wavelength-tunable light source after the lights in FIG. 3b being injected thereto respectively.

The peak wavelengths of the lights injected into a Fabry-Perot laser diode (FPLD) are 1530 nm, 1545 nm and 1560 nm, respectively, and the temperature of the Fabry-Perot laser diode (FPLD) was set for the side mode suppression ratio measured in FIG. 3c to be maximized in each case.

After a light injection, a Fabry-Perot laser diode provides a wavelength-selected output with a specific wavelength according to the wavelength of the injected light. The side mode suppression ratios measured are more than 30 dB and the output powers were about 0 dBm.

Therefore, it can be noticed that a light source in accordance with the present invention provides a narrow-band output with about more than 30 nm of wavelength-tunable range.

Figure 4A:
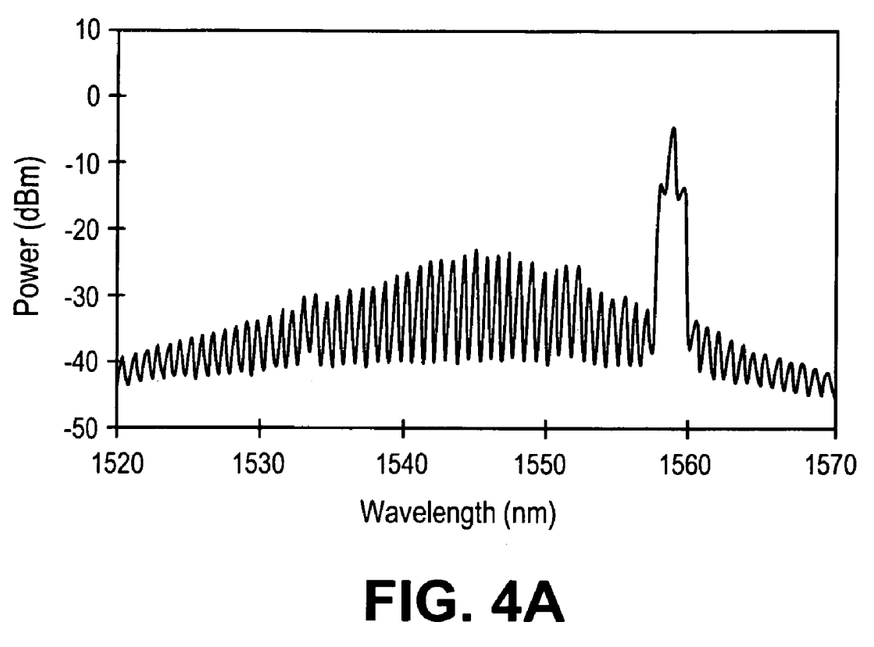
FIG. 4a.~FIG. 4b are optical spectra measured by the experimental setup described in FIG. 2 with a different optical filter.

FIG. 4a is an optical spectrum measured by the experimental setup described in FIG. 2 with a different optical filter, whose 3-dB bandwidth is about 100 GHz.

The center wavelength of the filter is about 1558.8 nm.

Here, the 3-dB bandwidth of the filter is comparable to the mode spacing of a of the Fabry-Perot laser diode (FPLD). In general, the light source in accordance with the present invention is can be realized while a light with a 3-dB bandwidth of several times of the mode spacing of Fabry-Perot laser diode is injected into the Fabry-Perot laser diode.

Figure 4B:
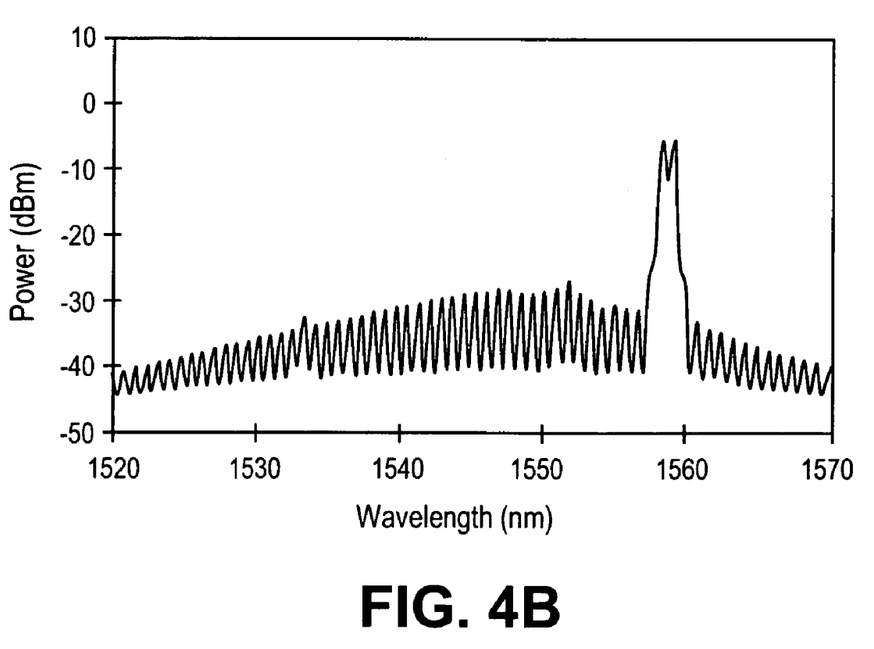

FIG. 4b is an optical spectrum measured by the same experimental setup, however, the temperature of the Fabry-Perot laser diode is tuned in order that the center wavelength of the injected light corresponds to the a mid-point of two cavity modes.

In this case, the light source provides a wavelength-selective output.

A Fabry-Perot laser diode (FPLD) used for a wavelength-tunable light source in accordance with the present invention can suppress the intensity noise of an injected incoherent light.

That is to say, as presented in the paper by Jae-Seung Lee ("Signal-to-noise ratio measurement of a 2.5-Gb/s spectrum-sliced incoherent light channel", *IEEE Photon. Technol. Lett.*, vol. 1, no. 1, pp. 94-96, 1997), a spectrum-sliced incoherent light has a large intensity noise.

This kind of intensity noise degrades the performance of a spectrum-sliced system.

In a wavelength-tunable light source in accordance with the present invention, a Fabry-Perot laser diode suppresses intensity noise of the injected incoherent light.

Figure 5A:
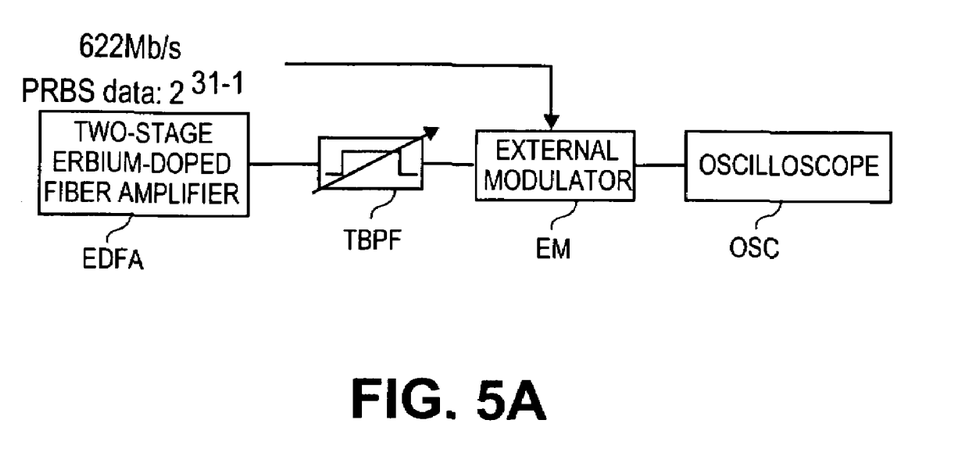
FIG. 5a is an experimental setup for measuring an eye diagram in a prior spectrum-sliced system and FIG. 5b is an experimental setup for measuring an eye diagram of a light source in accordance with the present invention.
Figure 5B:
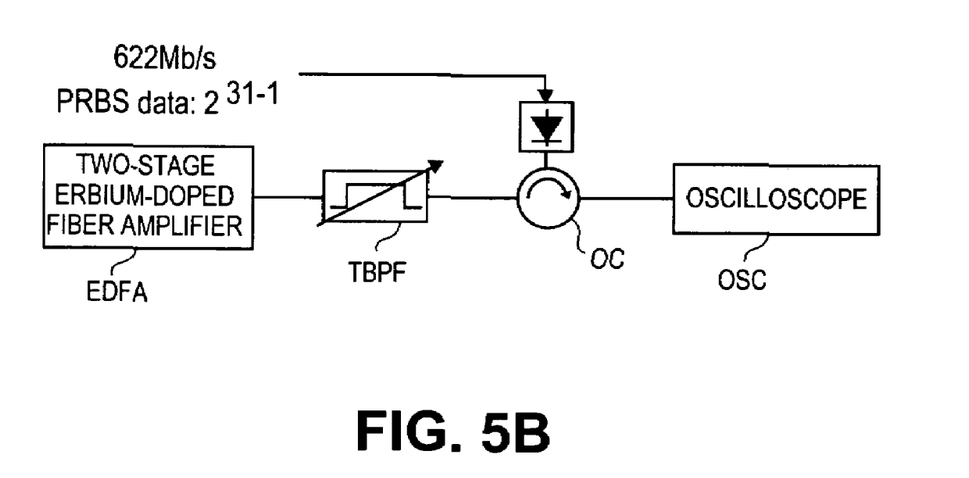

An experimental setup can be constituted for confirming this characteristic as described in FIG. 5.

The experimental setup described in FIG. 5a is for a prior spectrum-sliced system, which uses an external modulator (EM) followed by a tunable band-pass filter (TBPF) modulates narrow-band incoherent light and thereafter measures its eye diagram using an oscilloscope (OSC).

The experimental setup described in FIG. 5b is for a wavelength-tunable light source in accordance with the present invention, which injects an incoherent into a Fabry-Perot laser diode (FPLD), directly modulates the Fabry-Perot laser diode, and thereafter measures its eye diagram using an oscilloscope (OSC).

A Fabry-Perot etalon filter (FPEF) with a 3-dB bandwidth of about 2.5 GHz was used as a tunable band-pass filter (TBPF).

In both cases, the modulation bit rate were 622 Mb/s and the length of pseudo-random block signal (PRBS) applied to the external modulator or the Fabry-Perot laser diode (FPLD) was $2^{31}-1$.

Figure 6A:
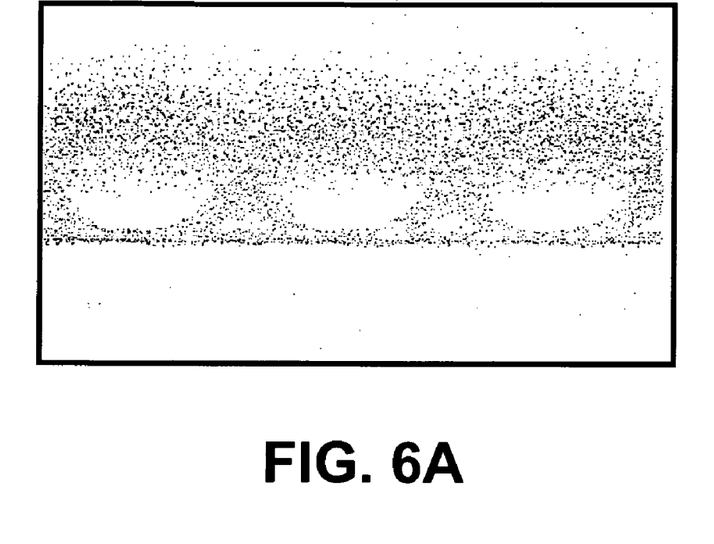
FIG. 6a and FIG. 6b are eye diagrams measured by the experimental setup described in FIG. 5a and FIG. 5b respectively.
Figure 6B:
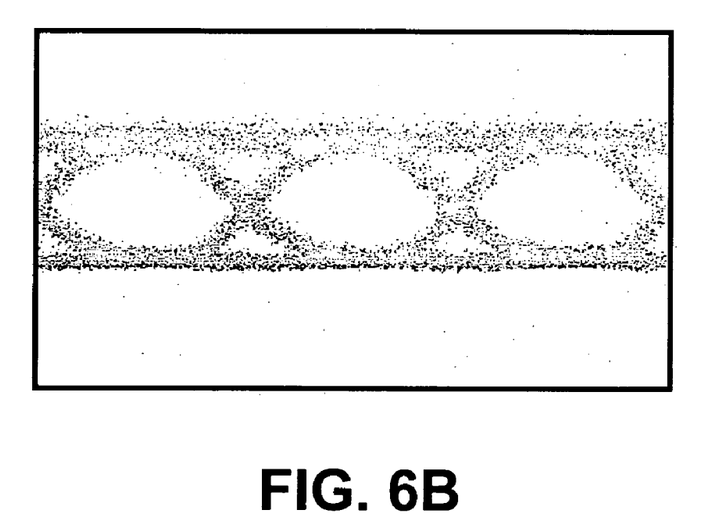

FIG. 6a and FIG. 6b are showing the eye diagrams measured in both cases respectively. Referring to the figures, it can be noticed that a wavelength-tunable light source in accordance with the present invention is suppressing the intensity noise of the incoherent light.

As mentioned thereinbefore, a wavelength-tunable light source in accordance with the present invention can be used for various applications in a wavelength-division multiplexed transmission system.

Figure 7:
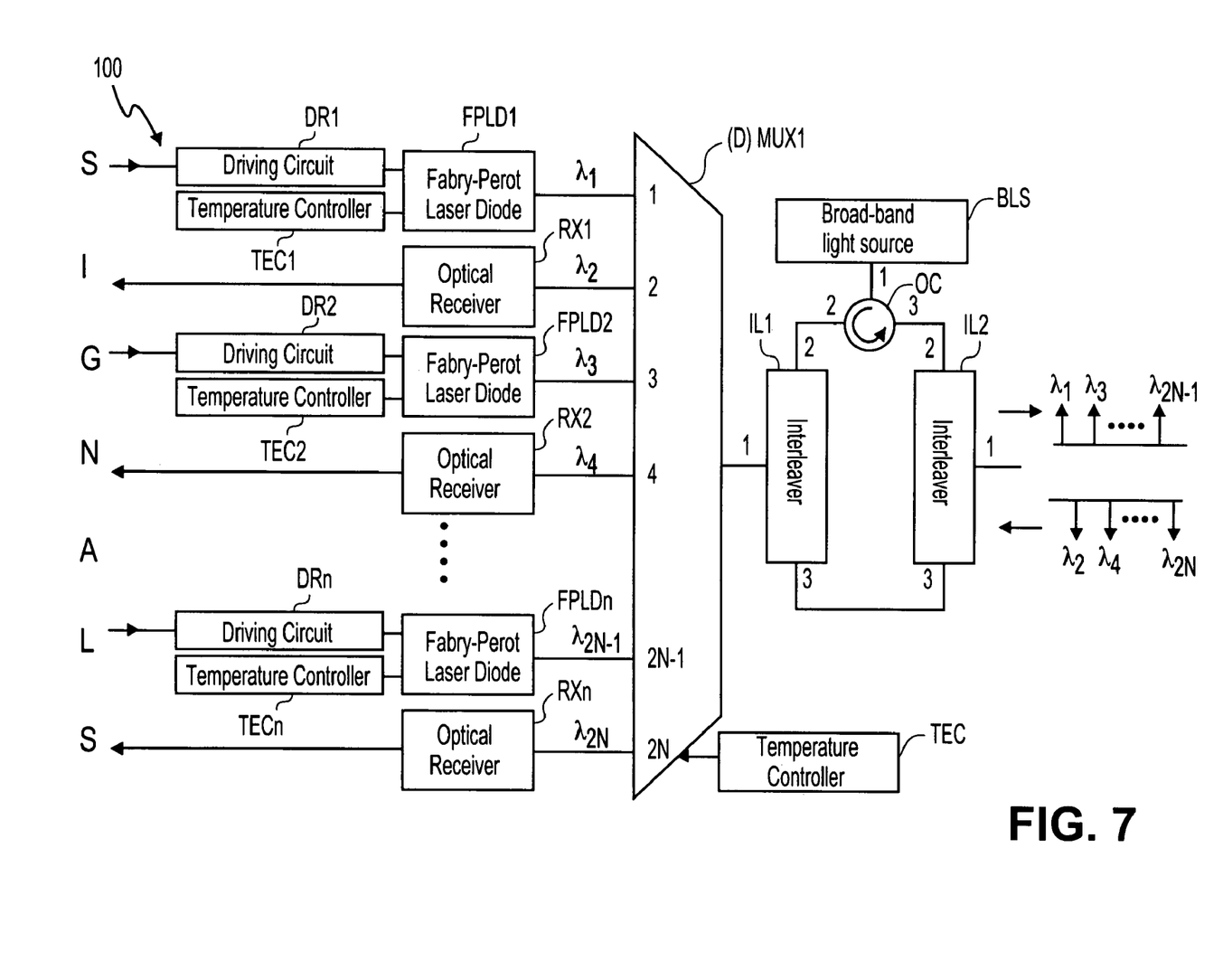
FIG. 7 is the first embodiment of a wavelength-division multiplexed transmission system in accordance with the present invention.

FIG. 7 shows the first embodiment of a wavelength-division multiplexed transmission system using a light source in accordance with the present invention, which outputs N first-group wavelength-division-multiplexed optical signals ($\lambda_1$, $\lambda_3$, . . . , $\lambda_{2N-1}$) through an optical fiber and receives N second-group wavelength-division-multiplexed optical signals ($\lambda_2$, $\lambda_4$, . . . , $\lambda_{2N}$) inputted through the fiber.

As described in FIG. 7, a wavelength-division multiplexed transmission system in accordance with the present invention comprises N Fabry-Perot laser diodes (FPLD1, FPLD2, . . . , FPLDn), N laser diode driving circuits (DR1, DR2, . . . , DRn), N laser diode temperature controllers (TEC1, TEC2, . . . , TECn), N optical receivers (RX1, RX2, . . . , RXn), a 2N×1 (de)multiplexer ((D)MUX1), a (de)multiplexer temperature controller (TEC), two wavelength interleavers (IL1, IL2), an optical circulator (OC) and an broad-band light source (BLS).

A (de)multiplexer ((D)MUX1) demultiplexes wavelength-division multiplexed optical signals inputted through a common and outputs them through 2N input/output ports respectively. Or, it multiplexes the optical signals having different wavelengths, which are inputted through 2N input/output ports respectively, and outputs them through the common port.

The wavelengths of the first-group optical signals ($\lambda_1$, $\lambda_3$, . . . , $\lambda_{2N-1}$) and the second-group optical signals ($\lambda_2$, $\lambda_4$, . . . , $\lambda_{2N}$) are arranged to be interlaid. The first-group optical signals ($\lambda_1$, $\lambda_3$, . . . , $\lambda_{2N-1}$) can be transferred between a common port and odd-numbered ports (1, 3, . . . , 2N−1) of a (de)multiplexer ((D)MUX1) and the second-group optical signals ($\lambda_2$, $\lambda_4$, . . . , $\lambda_{2N}$) can be transferred between a common port and even-numbered ports (2, 4, . . . , 2N) of a (de)multiplexer.

An broad-band light source (BLS) emits a wide-band light.

The optical circulator (OC) outputs the optical signals inputted through the first port through the second port and the optical signals inputted through the second port through the third port.

The wavelength interleavers (IL1, IL2) transfer the first-group optical signals ($\lambda_1$, $\lambda_3$, . . . , $\lambda_{2N-1}$) and block the second-group optical signals ($\lambda_2$, $\lambda_4$, . . . , $\lambda_{2N}$) between the first port and the second port, and on the other hand, they transfer the second-group optical signals ($\lambda_2$, $\lambda_4$, . . . , $\lambda_{2N}$) and block the first-group optical signals ($\lambda_1$, $\lambda_3$, . . . , $\lambda_{2N-1}$) between the first port and the third port.

The connection of a transmission system (100) described above can be performed as follows:

N Fabry-Perot laser diodes (FPLD1, FPLD2, . . . , FPLDn) are connected to the odd-numbered ports of a (de)multiplexer ((D)MUX1), and N optical receivers (RX1, RX2, . . . , RXn) are connected to the even-numbered ports of the (de)multiplexer ((D)MUX1) respectively.

The common port of a (de)multiplexer ((D)MUX1) is connected to the first port of a first wavelength interleaver (IL1), the second port of the first wavelength interleaver (IL1) is connected to the second port of an optical circulator (OC), the first port of the optical circulator (OC) is connected to an broad-band light source (BLS) and the third port of the optical circulator (OC) is connected to the second port of a second wavelength interleaver (IL2).

The third port of the first wavelength interleaver (IL1) and the third port of the second wavelength interleaver (IL2) are connected to each other, and the first port of the second wavelength interleaver (IL2) becomes an output port of a transmission system (100).

Looking into the operation principle of a transmission system (100), an broad-band light source (BLS) emits a wide-band light, the emitted light is then inputted through the first port of an optical circulator (OC), passing through the second port, and then inputted into the second port of a first wavelength interleaver (IL1).

Then, the first wavelength interleaver (IL1) outputs some portion of the inputted wide-band light through the first port.

The output from the first wavelength interleaver (IL1) is inputted into the common port of a (de)multiplexer ((D)MUX1), and outputted through corresponding odd-numbered ports of the (de)multiplexer ((D)MUX1) respectively.

The outputs from the (de)multiplexer ((D)MUX1) are inputted into N Fabry-Perot laser diodes (FPLD1, FPLD2, ..., FPLDn) respectively, and then N Fabry-Perot laser diodes (FPLD1, FPLD2, ..., FPLDn) output first-group optical signals ($\lambda_1, \lambda_3, \ldots, \lambda_{2N-1}$) whose wavelengths are within the pass-bands of the odd-numbered ports of the (de)multiplexer ((D)MUX1) respectively.

The first-group optical signals ($\lambda_1, \lambda_3, \ldots, \lambda_{2N-1}$) are multiplexed by the (de)multiplexer ((D)MUX1), and then inputted into the first port of the first wavelength interleaver (IL1).

The first-group optical signals ($\lambda_1, \lambda_3, \ldots, \lambda_{2N-1}$) inputted into the first wavelength interleaver (IL1) are outputted through the second port, passing through the second port and the third port of the optical circulator (OC), and then inputted into the second port of a second wavelength interleaver (IL2) to be outputted through the first port of the second wavelength interleaver (IL2).

The second-group optical signals ($\lambda_2, \lambda_4, \ldots, \lambda_{2N}$) inputted into the first port of the second wavelength interleaver (IL2) are outputted through the third port, and then inputted into the third port of the first wavelength interleaver (IL1) to be outputted through the first port, and thereafter inputted into the common port of the (de)multiplexer ((D)MUX1).

The second-group optical signals ($\lambda_2, \lambda_4, \ldots, \lambda_{2N}$) inputted through the common port are outputted through the corresponding even-numbered ports of the (de)multiplexer ((D)MUX1), and then received by optical receivers (RX1, RX2, ..., RXn) respectively.

Here, the transmission system (100) may further comprise N laser diode driving circuits (DR1, DR2, ..., DRn) to modulate N Fabry-Perot laser diodes N Fabry-Perot laser diodes (FPLD1, FPLD2, ..., FPLDn), N laser diode temperature controllers (TEC1, TEC2, ..., TECn) for controlling the temperatures of N Fabry-Perot laser diodes (FPLD1, FPLD2, ..., FPLDn) and a temperature controller (TEC) for controlling the temperature of the (de)multiplexer ((D)MUX1).

Figure 8:
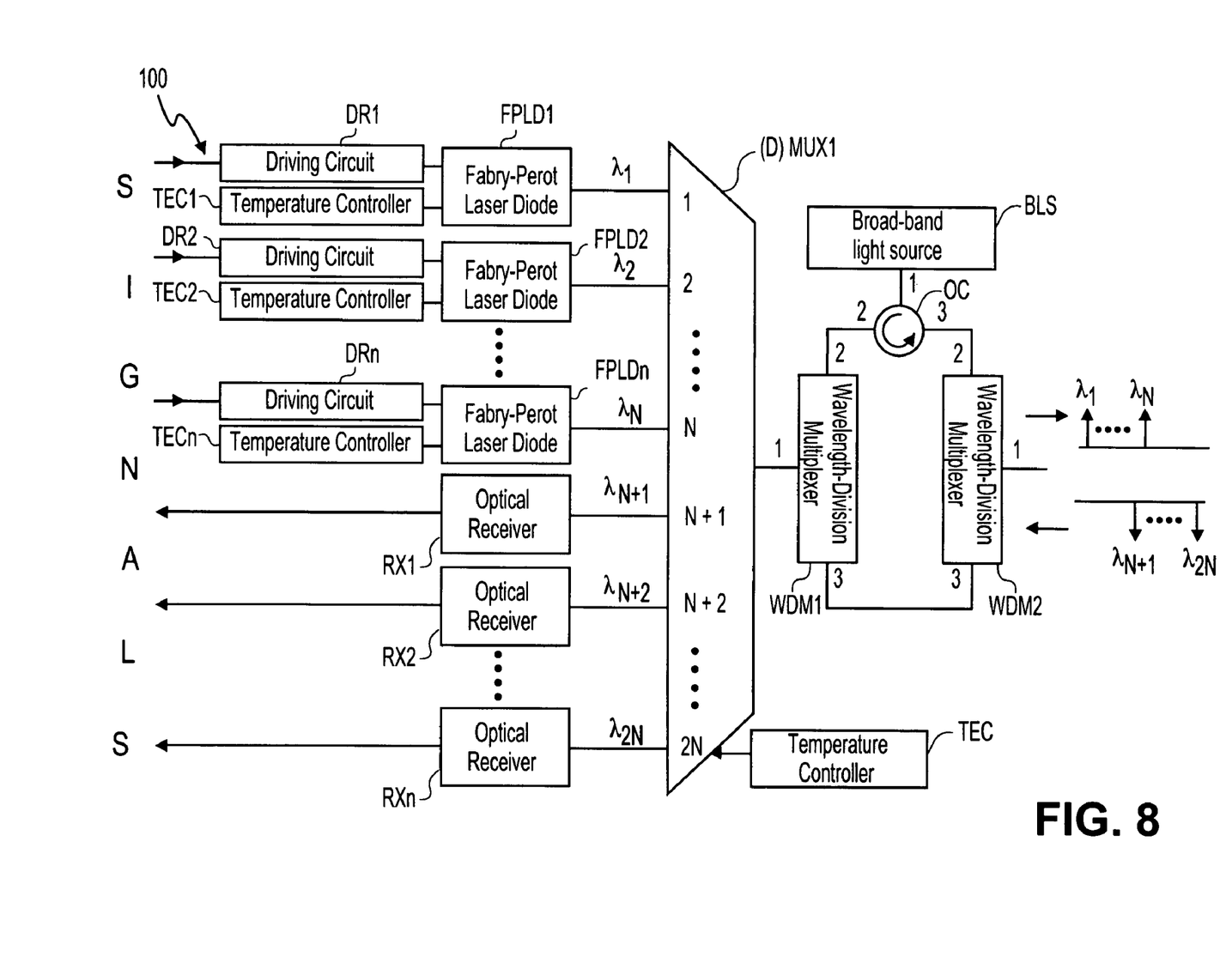
FIG. 8 is the second embodiment of a wavelength-division multiplexed transmission system in accordance with the present invention.

FIG. 8 shows the second embodiment of, a wavelength-division multiplexed transmission system using a light source in accordance with the present invention, which outputs N third-group wavelength-division-multiplexed optical signals ($\lambda_1, \lambda_2, \ldots, \lambda_{2N}$) through an optical fiber and receives N fourth-group wavelength-division-multiplexed optical signals ($\lambda_{N+1}, \lambda_{N+2}, \ldots, \lambda_{2N}$) inputted through the fiber.

As described in FIG. 8, a wavelength-division multiplexed transmission system in accordance with the present invention comprises N Fabry-Perot laser diodes (FPLD1, FPLD2, ..., FPLDn), N laser diode driving circuits (DR1, DR2, ..., DRn), N laser diode temperature controllers (TEC1, TEC2, ..., TECn), N optical receivers (RX1, RX2, ..., RXn), a 2N×1 (de)multiplexer ((D)MUX1), a (de)multiplexer temperature controller (TEC), two wavelength-division multiplexers (WDM1, WDM2), an optical circulator (OC) and an broad-band light source (BLS).

A (de)multiplexer ((D)MUX1) demultiplexes wavelength-division multiplexed optical signals inputted through a common port and outputs them through 2N input/output ports respectively. Or, it multiplexes the optical signals having different wavelengths, which are inputted through 2N input/output ports respectively, and outputs them through the common port.

The wavelengths of the third-group optical signals ($\lambda_1, \lambda_2, \ldots, \lambda_N$) and the fourth-group optical signals ($\lambda_{N+1}, \lambda_{N+2}, \ldots, \lambda_{2N}$) are arranged in different wavelength-bands respectively. The third-group optical signals ($\lambda_1, \lambda_2, \ldots, \lambda_N$) can be transferred between a common port and the (first~N-th) ports of a (de)multiplexer ((D)MUX1) and the fourth-group optical signals ($\lambda_{N+1}, \lambda_{N+2}, \ldots, \lambda_{2N}$) can be transferred between a common port and the (N+1-th~2N-th) ports of a (de)multiplexer.

An broad-band light source (BLS) emits a wide-band light.

The optical circulator (OC) outputs the optical signals inputted through the first port through the second port and the optical signals inputted through the second port through the third port.

The wavelength-division multiplexers (WDM1, WDM2) transfer the third-group optical signals ($\lambda_1, \lambda_2, \ldots, \lambda_N$) and block the fourth-group optical signals ($\lambda_{N+1}, \lambda_{N+2}, \ldots, \lambda_{2N}$) between the first port and the second port, and on the other hand, they transfer the fourth-group optical signals ($\lambda_{N+1}, \lambda_{N+2}, \ldots, \lambda_{2N}$) and block the third-group optical signals ($\lambda_1, \lambda_2, \ldots, \lambda_N$) between the first port and the third port.

The connection of a transmission system (100) described above can be performed as follows:

N Fabry-Perot laser diodes (FPLD1, FPLD2, ..., FPLDn) are, connected to the (first~N-th) ports of a (de)multiplexer ((D)MUX1), and N optical receivers (RX1, RX2, ..., RXn) are connected to the (N+1-th~2N-th) ports of the (de)multiplexer ((D)MUX1) respectively.

The common port of a (de)multiplexer ((D)MUX1) is connected to the first port of a first wavelength-division multiplexer (WDM1), the second port of the first wavelength-division multiplexer (WDM1) is connected to the second port of an optical circulator (OC), the first port of the optical circulator (OC) is connected to an broad-band light source (BLS) and the third port of the optical circulator (OC) is connected to the second port of a second wavelength-division multiplexer (WDM2).

The third port of the first wavelength-division multiplexer (WDM1) and the third port of the second wavelength-division multiplexer (WDM2) are connected to each other, and the first port of the second wavelength-division multiplexer (WDM2) becomes an output port of a transmission system (100).

Looking into the operation principle of a transmission system (106), the output of an broad-band light source (BLS) is inputted through: the first port of an optical circulator (OC), passing through the second port, and then inputted into the second port of a first wavelength-division multiplexer (WDM1).

Then, the first wavelength-division multiplexer (WDM1) outputs some portion of the inputted wide-band light through the first port.

The output from the first wavelength-division multiplexer (WDM1) is inputted into the common port of a (de)multiplexer ((D)MUX1), and outputted through the corresponding (first~N-th) ports of the (de)multiplexer ((D)MUX1) respectively.

The outputs from the (de)multiplexer ((D)MUX1) are inputted into N Fabry-Perot laser diodes (FPLD1, FPLD2, ..., FPLDn) respectively, and then N Fabry-Perot laser diodes (FPLD1, FPLD2, ..., FPLDn) output third-group optical signals ($\lambda_1, \lambda_2, \ldots, \lambda_N$) whose wavelengths are within the pass-bands of the (first~N-th) ports of the (de)multiplexer ((D)MUX1) respectively.

The third-group optical signals ($\lambda_1, \lambda_2, \ldots, \lambda_N$) are multiplexed by the (de)multiplexer ((D)MUX1), and then inputted into the first port of the first wavelength-division multiplexer (WDM1).

The third-group optical signals ($\lambda_1, \lambda_2, \ldots, \lambda_N$) inputted into the first wavelength-division multiplexer (WDM1) are outputted through the second port, passing through the second port and the third port of the optical circulator (OC), and then inputted into the second port of a second wavelength-division multiplexer (WDM2) to be outputted through the first port of the second wavelength-division multiplexer (WDM2).

The fourth-group optical signals ($\lambda_{N+1}, \lambda_{N+2}, \ldots, \lambda_{2N}$) inputted into the first port of the second wavelength-division multiplexer (WDM2) are outputted through the third port, and then inputted into the third port of, the first wavelength-division multiplexer (WDM1) to be outputted through the first port, and thereafter inputted into the common port of the (de)multiplexer ((D)MUX1).

Then, the signals inputted through the common port are outputted through the corresponding (N+1-th~2N-th) ports of the (de)multiplexer ((D)MUX1) and received by optical receivers (RX1, RX2, RXn) connected to the ports respectively.

Here, the transmission system (100) may further comprise N laser diode driving circuits (DR1, DR2, ..., DRn) to modulate N Fabry-Perot laser diodes (FPLD1, FPLD2, ..., FPLDn), N laser diode temperature controllers (TEC1, TEC2, ..., TECn) for controlling the temperatures of N Fabry-Perot laser diodes (FPLD1, FPLD2, ..., FPLDn) and a temperature controller (TEC) for controlling the temperature of the (de)multiplexer ((D)MUX1).

Figure 9:
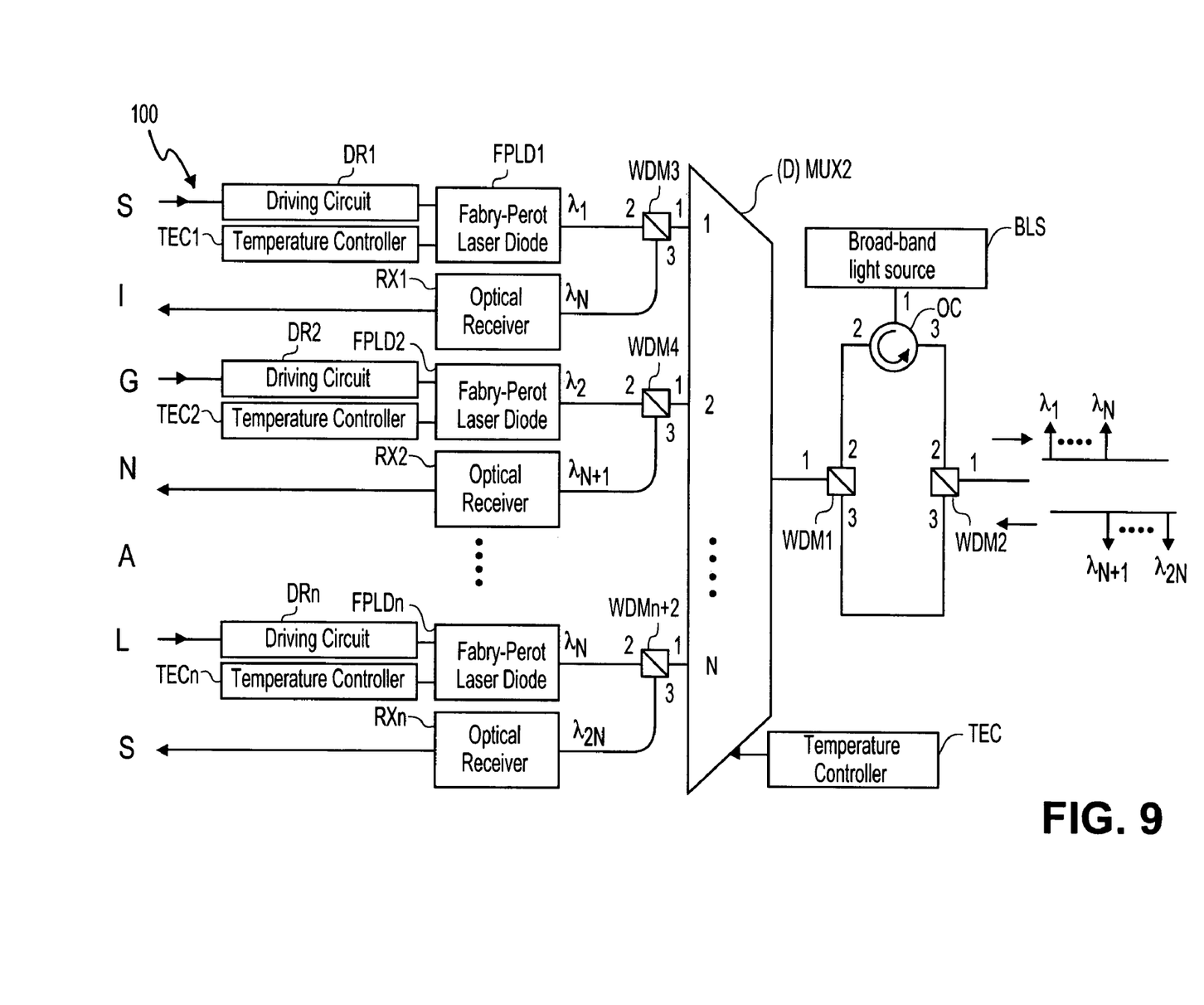
FIG. 9 is the third embodiment of a wavelength-division multiplexed transmission system in accordance with the present invention.

FIG. 9 shows a third embodiment of a wavelength-division multiplexed transmission system using a light source in accordance with the present invention, which outputs N fifth-group wavelength-division-multiplexed optical signals ($\lambda_1, \lambda_2, \ldots, \lambda_N$) through an optical fiber and receives N sixth-group wavelength-division-multiplexed optical signals ($\lambda_{N+1}, \lambda_{N+2}, \ldots, \lambda_{2N}$) inputted through the fiber.

As described in FIG. 9, a wavelength-division multiplexed transmission system in accordance with the present invention comprises N Fabry-Perot laser diodes (FPLD1, FPLD2, ..., FPLDn), N laser diode driving circuits (DR1, DR2, ..., DRn), N laser diode temperature controllers (TEC1, TEC2, ..., TECn), N optical receivers (RX1, RX2, ..., RXn), an N×1 (de)multiplexer ((D)MUX2), a (de)multiplexer temperature controller (TEC), (N+2) wavelength-division multiplexers (WDM1, ..., WDMn$_{+1}$, WDMn$_{+2}$), an optical circulator (OC) and an broad-band light source (BLS).

A (de)multiplexer ((D)MUX2) demultiplexes wavelength-division multiplexed optical signals inputted through a common port and outputs them through N input/output ports respectively. Or, it multiplexes the optical signals having different wavelengths, which are inputted through N input/output ports respectively, and outputs them through the common port. Here, the signal transfer characteristics between the common port and each input/output port are repeated with a wavelength interval of I(an arbitrary integer) times the free spectral range of the (de)multiplexer ((D)MUX2).

The wavelengths of the fifth-group optical signals ($\lambda_1, \lambda_2, \ldots, \lambda_N$) and the sixth-group optical signals ($\lambda_{N+1}, \lambda_{N+2}, \ldots, \lambda_{2N}$) are arranged in different wavelength-bands respectively. Both the fifth-group-optical signals ($\lambda_1, \lambda_2, \ldots, \lambda_N$) and the sixth-group optical signals ($\lambda_{N+1}, \lambda_{N+2}, \ldots, \lambda_{2N}$) can be transferred between a common port and N input/output ports of a (de)multiplexer ((D)MUX2), however, the wavelengths of the fifth-group optical signals ($\lambda_1, \lambda_2, \lambda_N$) and the sixth-group optical signals ($\lambda_{N+1}, \lambda_{N+2}, \ldots, \lambda_{2N}$) are arranged to be apart from each other with the interval of I(an arbitrary integer) times the free spectral range of the (de)multiplexer ((D)MUX2) respectively.

An broad-band light source (BLS) emits a wide-band light.

The optical circulator (OC) outputs the optical signals inputted through the first port through the second port and the optical signals inputted through the second port through the third port.

The wavelength-division multiplexers (WDM1, ..., WDMn$_{+}$1, WDMn$_{+}$2) transfer the fifth-group optical signals ($\lambda_1, \lambda_2, \ldots, \lambda_N$) and block the sixth-group optical signals ($\lambda_{N+1}, \lambda_{N+2}, \ldots, \lambda_{2N}$) between the first port and the second port, and on the other hand, they transfer the sixth-group optical signals ($\lambda_{N+1}, \lambda_{N+2}, \ldots, \lambda_{2N}$) and block the fifth-group optical signals ($\lambda_1, \lambda_2, \ldots, \lambda_N$) between the first port and the third port.

The connection of a transmission system (100) described above can be performed as follows:

N input/output ports of a (de)multiplexer ((D)MUX2) are connected to the first ports of N wavelength-division multiplexers (WDM3, ..., WDMn$_{+}$1, WDMn$_{+}$2), N Fabry-Perot laser diodes (FPLD1, FPLD2, ..., FPLDn) are connected to the second ports of N wavelength-division multiplexers (WDM3, ..., WDMn$_{+}$1, WDMn$_{+}$2), and N optical receivers (RX1, RX2, ..., RXn) are connected to the third ports of N wavelength-division multiplexers (WDM3, ..., WDMn$_{+}$1, WDMn$_{+}$2) respectively.

The common port of a (de)multiplexer ((D)MUX2) is connected to the first port of a first wavelength-division multiplexer (WDM1), the second port of the first wavelength-division multiplexer (WDM1) is connected to the second port of the optical circulator (OC), the first port of an optical circulator (OC) is connected to an broad-band light source (BLS) and the third port of the optical circulator (OC) is connected to the second port of a second wavelength-division multiplexer (WDM2).

The third port of the first wavelength-division multiplexer (WDM1) and the third port of the second wavelength-division multiplexer (WDM2) are connected to each other, and the first port of the second wavelength-division multiplexer (WDM2) becomes an output port of a transmission system (100).

Looking into the operation principle of a transmission system (100), the output of an broad-band light source (BLS) is inputted through the first port of an optical circulator (OC), passing through the second port, and then inputted into the second port of a first wavelength-division multiplexer (WDM1).

Then, the first wavelength-division multiplexer (WDM1) outputs some portion of the inputted light through the first port.

The output from the first wavelength-division multiplexer (WDM1) is inputted into the common port of a (de)multiplexer ((D)MUX2), and then outputted through the corresponding input/output ports of the (de)multiplexer ((D)MUX2) respectively.

The outputs from the (de)multiplexer ((D)MUX2) are inputted into the first ports of N wavelength-division multiplexers (WDM3, ..., WDMn$_{+1}$, WDMn$_{+}$2), and then outputted through the second ports to be inputted into N Fabry-Perot laser diodes (FPLD1, FPLD2, ..., FPLDn) respectively.

N Fabry-Perot laser diodes (FPLD1, FPLD2, ..., FPLDn) output fifth-group optical signals ($\lambda_1, \lambda_2, \ldots, \lambda_N$) whose wavelengths are within the pass-bands of the N input/output ports of the (de)multiplexer ((D)MUX2) respectively.

The fifth-group optical signals ($\lambda_1, \ldots \lambda_2, \lambda_N$) are transferred through N wavelength-division multiplexers (WDM3, ..., WDMn$_{+1}$, WDMn$_{+2}$) to be inputted into the (de)multiplexer ((D)MUX2) and multiplexed therein. Then the multiplexed signals are inputted into the first port of the first wavelength-division multiplexer (WDM1).

The fifth-group optical signals ($\lambda_1, \lambda_2, \ldots, \lambda_N$) inputted into the first wavelength-division multiplexer (WDM1) are outputted through the second port, passing through the second port and the third port of the optical circulator (OC), and then inputted into the second port of the second wavelength-division multiplexer (WDM2) to be outputted through the first port of the second wavelength-division multiplexer (WDM2).

The sixth-group optical signals ($\lambda_{N+1}, \lambda_{N+2}, \ldots, \lambda_{2N}$) inputted into the first port of the second wavelength-division multiplexer (WDM2) are outputted through the third port, and then inputted into the third port of the first wavelength-division multiplexer (WDM1) to be outputted through the first port, and thereafter inputted into the common port of the (de)multiplexer ((D)MUX2).

The sixth-group optical signals ($\lambda_{N+1}, \lambda_{N+2}, \ldots, \lambda_{2N}$) inputted through the common port are outputted through the corresponding input/output ports of the (de)multiplexer ((D)MUX2) to be inputted into the first ports of N wavelength-division multiplexers (WDM3, ..., WDMn$_{+1}$, WDMn$_{+2}$) respectively.

The sixth-group optical signals ($\lambda N_{+1}, \lambda_{N+2}, \ldots, \lambda_{2N}$) inputted into N wavelength-division multiplexers (WDM3, ..., WDMn$_{+1}$, WDMn$_{+2}$) are then outputted through the third ports of the wavelength-division multiplexers to be received by optical receivers (RX1, RX2, ..., RXn).

Here, the transmission system (100) may further comprise N laser diode driving circuits (DR1, DR2, ..., DRn) to modulate N Fabry-Perot laser diodes (FPLD1, FPLD2, ..., FPLDn), N laser diode temperature controllers (TEC1, TEC2, ..., TECn) for controlling the temperatures of N Fabry-Perot laser diodes (FPLD1, FPLD2, ..., FPLDn) and a temperature controller (TEC) for controlling the temperature of the (de)multiplexer ((D)MUX2).

Figure 10:
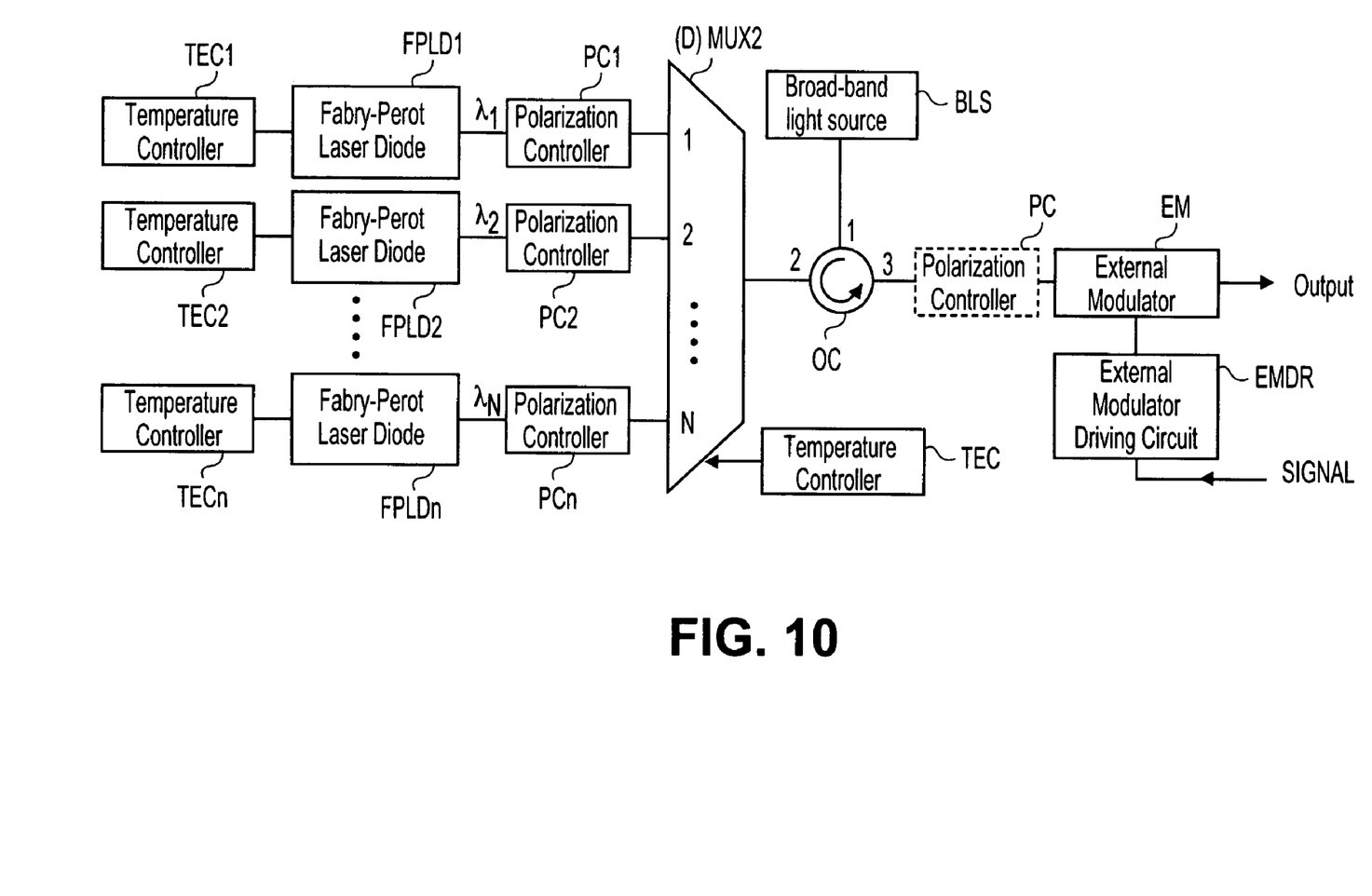
FIG. 10 is the fourth embodiment of a wavelength-division multiplexed transmission system in accordance with the present invention.

FIG. 10 is the fourth embodiment of a wavelength-division multiplexed transmission system using a light source in accordance with the present invention.

As described in FIG. 10, a wavelength-division multiplexed transmission system in accordance with the present invention comprises N Fabry-Perot laser diodes (FPLD1, FPLD2, ..., FPLDn), N laser diode temperature controllers (TEC1, TEC2, ..., TECn), an N×1 (de)multiplexer ((D)MUX2), a (de)multiplexer temperature controller (TEC), an optical circulator (OC), an broad-band light source (BLS), an external modulator (EM), and an external modulator driving circuit (EMDR).

A (de)multiplexer ((D)MUX2) demultiplexes wavelength-division multiplexed optical signals inputted through a common port and outputs them through N input/output ports respectively. Or, it multiplexes the optical signals having different wavelengths, which are inputted through N input/output ports respectively, and outputs them through the common port.

An broad-band light source (BLS) emits a wide-band light.

The optical circulator (OC) outputs the optical signals inputted through the first port through the second port and the optical signals inputted through the second port through the third port.

The connection of a transmission system (100) described above can be performed as follows:

N Fabry-Perot laser diodes (FPLD1, FPLD2, ..., FPLDn) are connected to N ports of a (de)multiplexer ((D)MUX2) respectively, and the common port of the (de)multiplexer ((D)MUX2) is connected to the second port of an optical circulator (OC).

The first port of the optical circulator (OC) is connected to an broad-band light source (BLS) and the third port of the optical circulator (OC) is connected to an external modulator (EM).

An external modulator driving circuit (EMDR) is connected to the external modulator (EM), and thus electric signals are inputted into the external modulator driving circuit (EMDR) and modulated optical signals are outputted through the external modulator (EM).

Looking into the operation principle of a transmission system (100), the output of an broad-band light source (BLS) is inputted through the first port of an optical circulator (OC), passing through the second port to be inputted into the common port of a (de)multiplexer ((D)MUX2), and then outputted through the corresponding N ports of (de)multiplexer ((D)MUX2) respectively.

The outputs from the (de)multiplexer ((D)MUX2) are inputted into N Fabry-Perot laser diodes (FPLD1, FPLD2, ..., FPLDn) respectively, and each of the Fabry-Perot laser diodes (FPLD1, FPLD2, ..., FPLDn) outputs optical signals whose wavelengths are within the within the pass-bands of the N ports of a (de)multiplexer ((D)MUX2) respectively.

The outputs from N Fabry-Perot laser diodes (FPLD1, FPLD2, FPLDn) are multiplexed by the (de)multiplexer ((D)MUX2), passing through the optical circulator (OC), and then inputted into the external modulator (EM). Then, the external modulator (EM) modulates the inputted optical signals, with using the received electric signals, and outputs the modulated signals.

In a transmission system (100) described above, by controlling the currents applied to the Fabry-Perot laser diodes (FPLD1, FPLD2, ..., and FPLDn), it is possible to control that optical signals with a (or more than 2) specific wavelength(s) are outputted through the external modulator (EM).

A transmission system (100) of the present invention further comprises N polarization controllers (PC1, PC2, ..., PCn) connected between the input/output ports of a (de)multiplexer ((D)MUX2) and N Fabry-Perot laser diodes (FPLD1, FPLD2, ..., FPLDn) or a polarization controller (PC) connected between an external modulator (EM) and an optical circulator (OC).

The transmission system (100) further comprises N laser diode temperature controllers (TEC1, TEC2, ..., TECn) for controlling the temperatures of N Fabry-Perot laser diodes (FPLD1, FPLD2, ..., FPLDn) and a temperature controller (TEC) for controlling the temperature of a (de)multiplexer ((D)MUX2).

Figure 11:
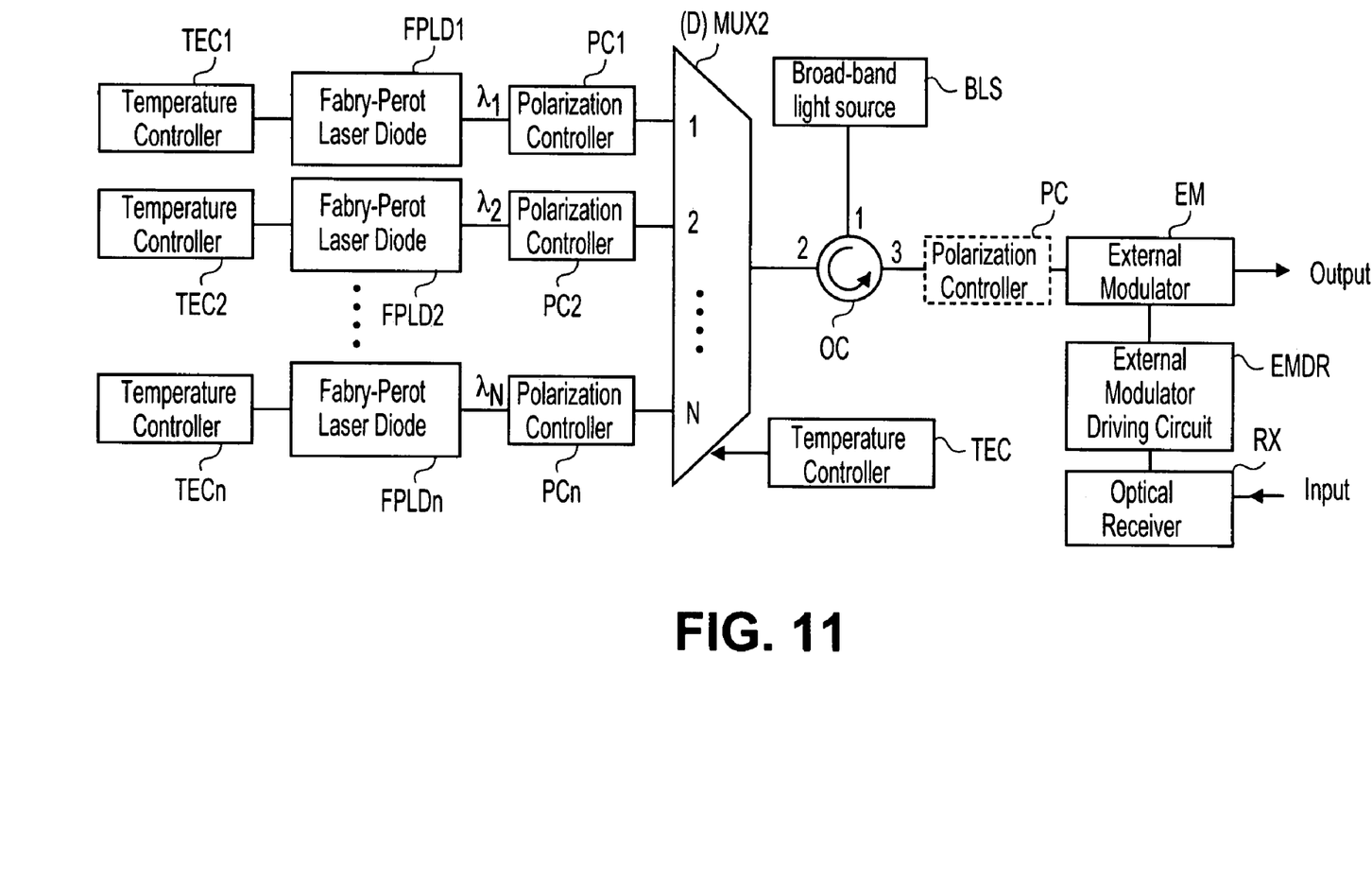
FIG. 11 is the fifth embodiment of a wavelength-division multiplexed transmission system using a light source in accordance with the present invention.

FIG. 12 shows the fifth embodiment of a wavelength-division multiplexed transmission system using a light source in accordance with the present invention, which further comprises an optical receiver (RX) with the structure of a transmission system described in FIG. 10.

An optical receiver (RX) converts the input optical signals into electric signals.

With comprising an additional optical receiver (RX), when optical signals with a specific wavelength is externally inputted, the system can converts the signal into electric signal, and then converts it back to the optical signal(s) with a (or more than 2) wavelength(s).

Here, the wavelengths of optical signals outputted through an external modulator (EM) can be varied by controlling the currents applied to the Fabry-Perot laser diodes (FPLD1, FPLD2, ..., FPLDn).

As mentioned thereinbefore, a transmission system using a light source in accordance with the present invention reduces the cost per channel. Moreover, it can increase the output power, and thus it makes it easy to constitute a transmission system and expand the network coverage.

In addition, a wavelength-division multiplexed transmission system in accordance with the present invention is constituted for wavelength-division multiplexed optical signals to be inputted and/or outputted through the same optical fiber, and thus it can reduce the number of fibers required for optical communication to be half of that of the prior art.

Since those having ordinary knowledge and skill in the art of the present invention will recognize additional modifications and applications within the scope thereof, the present invention is not limited to the embodiments and drawings described above.

What is claimed is:

1. A wavelength-division multiplexed transmission system, comprising:

an optical circulator to route a broadband wavelength of light inputted through a first port to a second port and to route an optical signal from N number of Fabry-Perot laser diodes inputted through the second port to a third port;

an N×1 multiplexer/demultiplexer having a common port and N number of input/output ports to transfer optical signals having different wavelengths between the common port and the N number of input/output ports respectively, wherein N represents the number of subscribers connected to the multiplexer/demultiplexer, the N number of Fabry-Perot laser diodes connect to the N number of input/output ports of the multiplexer/demultiplexer respectively, and the common port of the multiplexer/demultiplexer connects to the second port of the optical circulator;

an external modulator having an input port and an output port for optical signals, wherein the external modulator to modulate optical signals inputted through the input port according to electrical signals applied thereto and to pass the modulated signals through the output port; and an external modulator driving device to provide the electrical signals for operating the external modulator, wherein the third port of the optical circulator couples to the input port of the external modulator, and the external modulator driving device connects to the external modulator.

* * * * *